Figure 1:
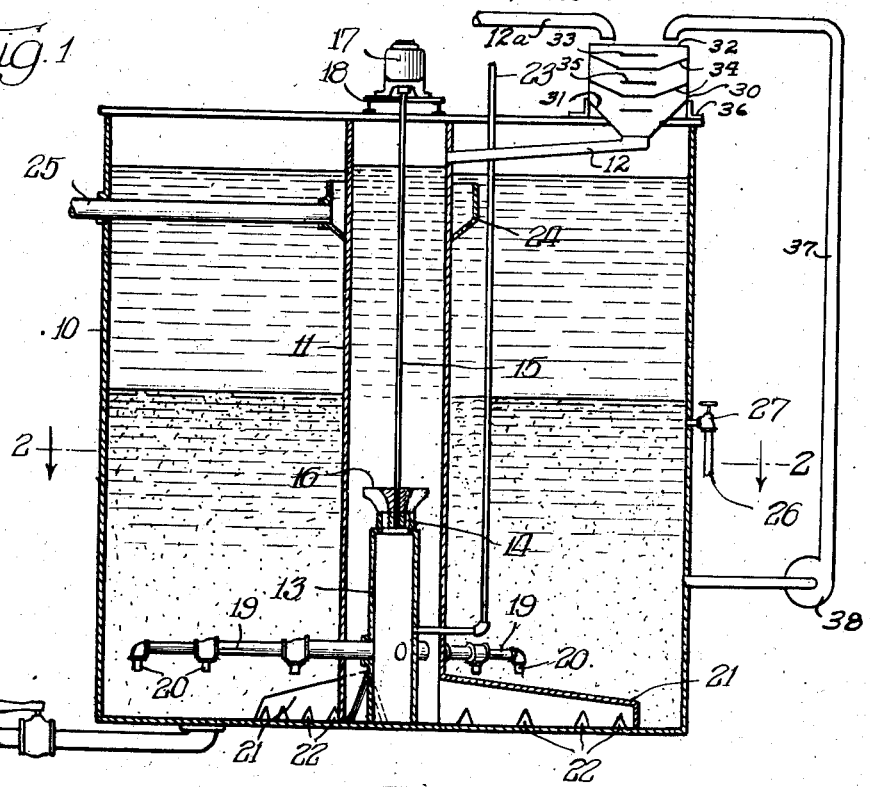

Aug. 3, 1943.  W. J. HUGHES  2,325,679
STABILIZATION OF LIQUIDS
Original Filed June 5, 1936

INVENTOR.
Walter J. Hughes,
BY Cromwell, Greist & Warden
ATTYS.

Patented Aug. 3, 1943

2,325,679

UNITED STATES PATENT OFFICE 2,325,679

STABILIZATION OF LIQUIDS

Walter J. Hughes, Chicago, Ill., assignor to Infilco Incorporated, a corporation of Delaware Original application June 5, 1936, Serial No. 83,662, now Patent No. 2,245,587, dated June 17, 1941. Divided and this application August 22, 1940, Serial No. 353,637

8 Claims. (Cl. 210—16)

The present invention relates to liquid treatment and in particular to stabilization of water with respect to dissolved calcium carbonate and bicarbonate. Unstable solutions of this kind tend either to form deposits or to dissolve solids. Such irregularities call for stabilization. The stabilization of waste water or brine from oil fields is illustrative. The present application is a division of my copending application Serial No. 83,662, filed June 5, 1936, now a patent Serial No. 2,245,587, issued June 17, 1941.

I am aware of stabilization processes such as those applied in water softening, also of the treatment of what is known as aggressive water which may call for addition of hardening compounds. Prior methods of the type referred to are satisfactory in small scale operation or where it is not necessary to closely control the amount of dissolved matter above or below the point of theoretical solubility, in the effluent of the stabilizing device. Wherever such a close control, or a close approach to the point of theoretical solubility is needed it has been necessary heretofore to allow excessively long detention periods which in most instances have rendered such operation impractical. The present invention provides a method to rapidly, efficiently and economically stabilize unstable solutions, eliminating the shortcomings of prior methods.

It has been discovered that oil can be more readily displaced from oil bearing sand by flooding the sand with water. It is, therefore, not uncommon in oil field operations to pump water into the oil bearing sands. Also, in oil field operations considerable quantities of water are brought to the surface. This water ordinarily contains considerable quantities of mineral salts and is commonly called brines. It has been suggested that these brines be used for pumping into the oil bearing sands for the flooding operation. However, such brines usually contain dissolved calcium carbonate in unstable amounts. The return of such an unstabilized brine to the oil bearing sand results in clogging distribution pipes and the oil bearing sands adjacent thereto through the depositing of calcium carbonate thereon. Occasionally the brines will be undersaturated with calcium carbonate and corrosion of the distribution pipes follows. The bulk of the dissolved calcium carbonate of course is present as bicarbonate. Under underground pressures the bicarbonate may be stable, but when the pressure is released by bringing the brine to the surface carbon dioxide escapes to render the brine supersaturated with respect to calcium carbonate, thereby resulting in the deposition of calcium carbonate on surfaces with which the brine is brought in contact. It is this deposition of calcium carbonate that generally results in clogging distribution pipes through which the brine passes and also the oil bearing sand into which the brine desirably is pumped in a flooding operation to dislodge and displace additional amounts of oil. In other cases such brines are undersaturated and tend to dissolve additional calcium carbonate by the presence of an excess of carbon dioxide. A brine of the latter class prevents the slight deposit or film of calcium carbonate on the surface of pipes that is desirable because its presence protects the pipes from corrosion on contact with oxygen and other aggressive matters in the brine. In still other cases, liquid mixtures received from different points of the process are sometimes supersaturated and at other times undersaturated with calcium carbonate, depending on momentary preponderance of any one of several sources of supply, and the composition thereof.

A principal object of this invention is the rapid stabilization of water on a large scale.

Another object is the stabilization of solutions by first removing free carbon dioxide or the like, and thereafter treating the water by a particular type of contact with the medium adapted to be taken up thereby or to be augmented therefrom. In some cases the $CO_2$ removal and contact steps may be applied alternately and repeatedly.

An additional object is the stabilization of water containing large quantities of calcium bicarbonate by aerating the water to remove carbon dioxide and to leave the water supersaturated with calcium carbonate and then passing the water through a turbulent mixing zone with a slurry composed of water containing suspended particles of calcium carbonate collected from a relatively large volume of previously stabilized water, the circulated slurry being passed convergently from a pool thereof to the mixing zone and divergently from the mixing zone back into the pool of slurry, so that the supersaturated water comes in contact with a large number of previously precipitated and conditioned particles of calcium carbonate and the calcium carbonate present above the point of saturation quickly and thoroughly is precipitated in the presence of and accretes upon the slurry particles. The invention also includes clarification of the treated water by displacement from the slurry without sedimentation.

Another object is to provide a method of treating unstable brine which comprises maintaining a concentrated accumulation of particles of the treating medium, in the form of a slurry of such particles, and an efficient circulation thereof, and mixing the unstable brine with such circulating slurry whereby the unstable brine will become stabilized by contact with the treating medium. I also provide steps to adjust the amount of contact medium accumulated, the concentration thereof and other features of importance for the success of this process.

Figure 2:
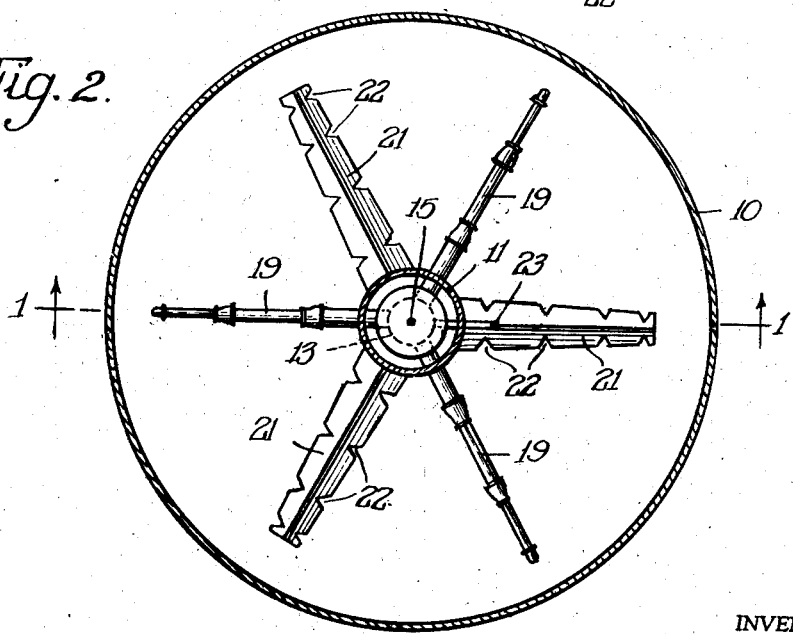

These and other objects hereof will be better understood on consideration of the following description and the drawing attached wherein Fig. 1 is a vertical sectional view of apparatus suitable for carrying out my improved method, taken along line 1—1 of Fig. 2; and Fig. 2 is a horizontal sectional view taken along line 2—2 of Fig. 1.

The apparatus includes a tank 10 being a vertical cylinder of uniform circular cross-section and being open at the top. Extending upwardly through the center of the tank is a smaller cylinder 11 which connects adjacent the top of the tank with inlet pipe 12 for liquid to be stabilized, which may lead from an aerator, 30, hereinafter described. Within the cylinder 11 there is a still smaller cylindrical compartment 13. The upper end of compartment 13 carries spider bearing 14 in which is journaled shaft 15. The shaft carries a centrifugal impeller 16 and is driven by motor 17 supported on frame structure 18 at the top of the tank. Extending outwardly from compartment 13 through the wall of cylinder 11 are a series of collecting lines 19 having spaced pickup openings 20 which are positioned in the outer space of tank 10 a few inches above the bottom thereof. It is preferred that pickup openings 20 be spaced in such manner as to collect liquid evenly from the various parts of said outer tank space and to provide converging streams of liquid to compartment 13.

Communicating with the bottom of cylinder 11 are a series of diverging inverted V-shaped discharge conduits or arms 21 which are provided with discharge slots 22. The slots are spaced over the area of the outer tank space in a manner similar to the one described in connection with pickup openings 20 so as to produce an even discharge of liquid in the various parts of the bottom of that outer tank space. Rotation of impeller 16 provides liquid head in cylinder 11 which in turn causes a current through 11, out through 22 and back through 20.

To provide for addition of treating material, a line 23 leads from outside the tank to compartment 13. Adjacent the top of the tank is mounted an outlet overflow funnel 24, and outlet conduit 25 conveys treated liquid from this funnel to the point of use, storage or further treatment. A slurry discharge pipe 26 provided with valve 27 is mounted in the side of tank 10 at an elevation below the top of funnel 24 and preferably above the bottom of the tank. Suitable drains and the like can be added.

The zone or assembly formed by compartment 13 and the lower part of cylinder 11 and arms 21 receives unstable liquid from the upper part of cylinder 11 and slurry from 20. Inasmuch as it is in this assembly that recirculated slurry is turbulently treated and mixed with liquid to be stabilized, this assembly is referred to as a treating or mixing zone, or zone of relatively turbulent agitation. This latter term will be understood with reference to the outer zone of tank 10 and especially the upper part of the outer zone wherein relative quiescence prevails, but in which sufficient turbulence or agitation is maintained as is required to keep heavy slurry particles in suspension against their tendency to settle.

An initial stage of operation includes the establishment in the lower part of tank 10 of a pool of slurry. This slurry provided during the initial stage is thereafter maintained and used during operation. It consists of brine with solid particles suspended therein, these particles being provided and conditioned as hereinafter described in more detail. No chemical reaction is necessarily involved in this stage of the stabilization and the process ordinarily can be carried out without the help of chemical reagents, although addition of coagulants or precipitants may be desirable to reduce turbidity, organic contents and the like.

In a simple embodiment of the process for stabilization of supersaturated brine, there may be provided in the lower portion of the tank 10 and mixing cylinder 11 a slurry composed of calcium carbonate, preferably in crystalline form, added through line 23 or otherwise. Supersaturated brine is passed into and through the slurry, and as slurry and brine are mixed there is formed a deposit of calcium carbonate from the brine on the particles of the slurry, building up such particles to larger size and probably greater specific weight and consistency, due to accretion on crystal surfaces of the slurry particles, of crystals newly separated from the brine. Initially adding crystals in this manner shortens the time for the process to become effective over the embodiment of the process in which the particles are built up from the brine itself.

If the brine received is undersaturated, calcium carbonate will be taken up from the slurry particles as calcium bicarbonate, on similar operation.

In order to provide more contact while economizing space and time of detention, vigorous agitation must be resorted to. Such agitation, however, is only allowable if it does not result in destruction rather than building up of agglomerated and accumulated particles. This has heretofore prevented the successful use of vigorous agitation. Such agitation as has been applied was relatively feeble. In the present invention destructive effects are avoided by novel features of conditioning and applying the contact medium, and more rapid agitation is made possible thereby.

Attention is here directed to the feature of providing a slurry or suspension and preventing sedimentation thereof throughout the process and conducting the stabilizing reaction in the presence and by means of such slurry. The particles of the slurry originally provided, being of size, weight and consistency suitable for vigorous agitation, are circulated into contact with brine which may be supersaturated with calcium carbonate which will then deposit on the particles of slurry and form built-up particles of at least similar consistency. Gradually the particles of the original slurry disappear by removal through slurry discharge pipe 26 but they are continuously supplemented by addition or deposition of new matter. As the replenishment is by deposition and accretion of crystals and growth thereof, the new particles are at least as sturdy and heavy as the ones originally provided.

The upper level of slurry in the outer space of tank 10, outside chamber 11, is rather well defined. The solids of the slurry pool assume a state of concentration depending on the rate of upward flow of brine in the outer tank space, the type, amount and average composition of newly formed solids, the temperature of the process and other process factors. Once the slurry pool has reached its state of maximum concentration, change in any of the process conditions results in a corresponding change in solids concentration. Of course, there is less concentration in chamber 11 where the slurry is diluted by addition of brine supersaturated with dissolved matter to be removed. It will be appreciated that in order to obtain the typical condition of the slurry pool in the outer annular space surrounding the cylinder 11 it is desirable to distribute the outflow from the relatively turbulent inner space within the lower portion of cylinder 11 as by the spaced arrangement of openings 22 and also to distribute the withdrawal for recirculation as by the arrangement of openings 20.

In the case of supersaturated brine referred to in the foregoing statement of the process, the upper level of the slurry pool is maintained at the desired elevation, preferably well below the take-off funnel, by withdrawing a small side stream of slurry through the blow-off line 26. If the amount of solids withdrawn through this blow-off is smaller than the amount of solids separated from the brine being treated, the upper level of the slurry pool will rise. Conversely, withdrawal of a greater amount of solids through the blow-off than is separated from the brine passing through the slurry pool results in a fall of the upper level of the slurry pool. It is preferred to withdraw the slurry from adjacent the top of the pool. With such a take-off the particles have a slow and general movement upwardly. The concentration of the solids throughout the slurry generally seems to be nearly uniform. However, lighter particles tend to accumulate at the top of the pool. Such particles are of less value as a slurry and have a tendency to be carried out with the treated brine. Consequently, draw-off of such particles assists in maintaining the pool of slurry in good condition.

In the case of an undersaturated brine the slurry is diminished due to the process and there must be replacement of slurry as through line 23 to continue the process, not only to start the same as in the foregoing example. No withdrawal through line 26 is needed in this case. The replacement may be either continuous or periodic.

In general, the density of the slurry increases with the density of the brine. Possibly this is due to a dehydrating effect upon the slurry of the salt contained in the brine. In some cases it is necessary or advantageous to control the density or general character of the slurry as for instance by having present therein some coagulating medium such as aluminum hydrate or by treating the liquid with lime to adjust its pH value.

The point of stability may be controlled within theoretical limits of solubility, by mechanical removal of dissolved carbon dioxide in the brine.

While calcium carbonate is soluble as such in water to the extent of roughly 15 parts per million, it dissolves as bicarbonate to the extent of several hundred parts per million, but a water containing calcium bicarbonate is not stable with respect thereto unless there is also present a certain amount of excess carbon dioxide in dissolved or free form. If, therefore, this excess or part thereof be taken out of the water, the equilibrium is upset. It is restored only at a lower calcium carbonate content.

Ordinarily the separation in solid form and the removal by sedimentation of the surplus of calcium carbonate is a very slow process requiring perhaps several hours if the water is cold. With my process I can bring it about within a few minutes.

The removal of carbon dioxide may be accomplished by passing the water over an aerator, such apparatus being capable of removing all the free carbon dioxide and even some of the half bound. Many suitable forms of aeration apparatus are known, for example, that described in U. S. Patent 2,115,188, in which the general procedure is described. A suitable aerating apparatus is shown in Figure 1 and may comprise a cylinder, 30, provided with a hopper bottom, 31, and an open top, 32. Within the upper portion of cylinder, 30, is located a horizontal baffle, 33, upon which the raw water conduit, 12a, discharges. Below the baffle and arranged within the cylinder are a plurality of inverted truncated cones, 34, and spaced below the open end of each of these cones, 34, is a suitable baffle or cup, 35, which acts to disperse water flowing from the cones. The aerator cylinder, 30, is supported by any suitable means such as brackets, 36. It will be readily understood that water discharging from the raw water feed pipe, 12a, will fall upon the upper baffle, 33, and thereafter be successively dispersed into drops, or a thin sheet of water, which are caught by the cones and redispersed by the baffles or cups therebelow, and that during the passage of liquid from top to bottom it will be aerated and carbon dioxide will be removed. The water may then be passed through a slurry in suitable apparatus such as that shown and described herein whereupon the excess of calcium carbonate quickly separates and equilibrium at a lower content is established. At this point there will again be some free carbon dioxide, and the water may abain be aerated to remove this and again passed through a slurry to reach a still lower level of calcium content. Such process may be carried out in several stages in series, each subsequent step being at a lower equilibrium level. It is possible, however, to carry it out in one apparatus having a single slurry, by a continuous circulation of water out of the apparatus over an aerator and back into the slurry. Each passage over the aerator removes some carbon dioxide and each passage through the slurry tends to stabilize the solution, with concurrent release of more carbon dioxide. An apparatus for such cyclic aeration is shown in Figure 1 and comprises a pipe, 37, which leads from the tank, 10, at a point below the slurry level, as shown, and likewise discharges upon the horizontal baffle, 33, of the aerator, 30. A pump, 38, in the line, 37, maintains a constant flow of slurry through the line, 37, and into the aerator, 30. In this type of structure the slurry and raw water may be passed through the aerator together so that only one aerator is required for the apparatus. It would of course be entirely feasible to have separate aerators for the raw water conduit and for the slurry conduit, 37, but I have found that very satisfactory results are secured by the use of a single aerator and the joint passage of both slurry and raw water therethrough. Thus, there may be a continuous flow of hard water into such an apparatus and a continuous treatment thereof and escape as softened and stabilized water. In this way in actual practice the calcium carbonate of the water has been reduced from an initial content of about 550 parts per million to about 140 parts per million in a one-stage apparatus having supplementary circulation and aeration, and resulting in stabilized effluent.

It will be obvious to persons skilled in this art that numerous modifications can be applied to the process described, and all of these are intended to be covered by the appended claims..

I claim:

1. The process of stabilizing water containing calcium bicarbonate, which comprises establishing a zone of slurry containing water and suspended particles of calcium carbonate collected from a relatively large volume of previously treated water, passing slurry from said zone through a turbulent mixing zone, producing a condition of supersaturation of the incoming unstabilized water with respect to dissolved calcium carbonate by removing therefrom dissolved carbon dioxide, passing said supersaturated water through said mixing zone with said slurry to effect precipitation of calcium carbonate in the presence of said particles of calcium carbonate in said slurry, passing the resulting mixture back into said zone of slurry, displacing clarified water upwardly out of said zone of slurry, withdrawing such clarified water from above said body of slurry, and imparting substantial energy to said slurry in addition to any energy imparted thereto by the incoming water to produce turbulence in said mixing zone, to maintain the particles in said slurry in suspension, and to recirculate substantial quantities of slurry through said mixing zone.

2. The process of stabilizing water containing objectionable quantities of calcium bicarbonate, which comprises first subjecting the water to an aeration step whereby carbon dioxide is removed and there is produced in the water a condition of supersaturation with respect to calcium carbonate, passing the so supersaturated water into a mixing zone and there mixing it with a slurry composed of water undergoing treatment and containing suspended particles of calcium carbonate collected from a relatively large quantity of previously stabilized water, passing said mixture from said mixing zone into a body of slurry, displacing clarified water upwardly from said slurry, and maintaining a circulation of slurry embracing said body thereof and said mixing zone by imparting to the slurry energy in addition to that imparted thereto by the incoming water.

3. The method of handling unstable oil well brine containing undesirably large quantities of calcium bicarbonate, which comprises the steps of first aerating the brine whereby carbon dioxide is removed and a condition of supersaturation of calcium carbonate is produced, then passing the said supersaturated brine into a body of slurry containing brine undergoing treatment and crystalline particles of calcium carbonate collected from previously stabilized brine, mixing and agitating together the brine and slurry whereby calcium carbonate deposits from solution in the brine on said particles, said mixing and agitation being continued for a period such as to secure substantially complete stabilization of said brine with respect to the dissolved calcium carbonate content thereof, separating the stabilized brine from said slurry, and passing the separated brine to a point of use.

4. The method of stabilizing water containing an undesirably large quantity of calcium bicarbonate, which comprises mechanically removing carbon dioxide from unstabilized water and so producing a state of supersaturation of calcium carbonate in said water, maintaining a pool of a slurry composed of water undergoing treatment and containing a substantial quantity of suspended particles of calcium carbonate collected from a relatively large volume of previously stabilized water, mixing the supersaturated water with said slurry, agitating the mixture for a period sufficiently long to secure substantially complete stabilization of said water by precipitation of said calcium carbonate in the presence of the suspended particles in said slurry, and separating stabilized water from said slurry.

5. The method of treating water containing a relatively large quantity of calcium bicarbonate to stabilize it with respect to such content, which comprises first aerating the water whereby carbon dioxide is liberated and removed and there is produced in said water a supersaturation of calcium carbonate, maintaining a pool of slurry composed of water undergoing treatment and containing a substantial quantity of suspended particles of crystalline calcium carbonate collected from a relatively large quantity of previously stabilized water, passing the aerated water into the slurry in said pool, turbulently mixing and circulating the aerated water in and with said slurry for a period of time sufficient to substantially stabilize said water by precipitation of calcium carbonate in the presence of the suspended particles in said slurry, separating treated water from the particles in said slurry, and returning the separated water for repeated aeration and stabilization.

6. The process of claim 2 wherein the water after being subjected to mixing and agitation in the slurry is subjected to a second aeration step and thereafter again subjected to mixture and agitation in and with the slurry.

7. In the treatment of water containing objectionable quantities of calcium carbonate the process which comprises alternatingly producing supersaturation in the water with respect to calcium carbonate by elimination of carbon dioxide from said water, and stabilizing said supersaturated water with respect to its calcium carbonate content by precipitating calcium carbonate, said precipitating comprising the step of agitating said water in and with a circulating slurry containing suspended particles of calcium carbonate collected from previously treated water, and continuing such alternate treatment until the calcium carbonate content of the water has reached a desired point, and finally separating clarified water from said slurry and withdrawing the clarified water.

8. A process of stabilizing water containing dissolved calcium carbonate which comprises the steps of providing a pool of slurry containing water undergoing treatment and suspended particles of calcium carbonate retained from previously stabilized water, removing carbon dioxide from unstabilized water, passing said water, after removal of carbon dioxide, into the pool of slurry, passing a greater amount of such slurry and said incoming water through a mixing and reaction zone and returning the mixture into said pool of slurry, retaining the water in and as part of the said slurry for a period to permit substantial stabilization of said water, separating stabilized water from the said slurry, and withdrawing the stabilized water to use.

WALTER J. HUGHES.